June 21, 1927.
D. H. VAN HOVE
SPRING STRUCTURE
Filed June 11, 1921
1,632,936
2 Sheets-Sheet 2
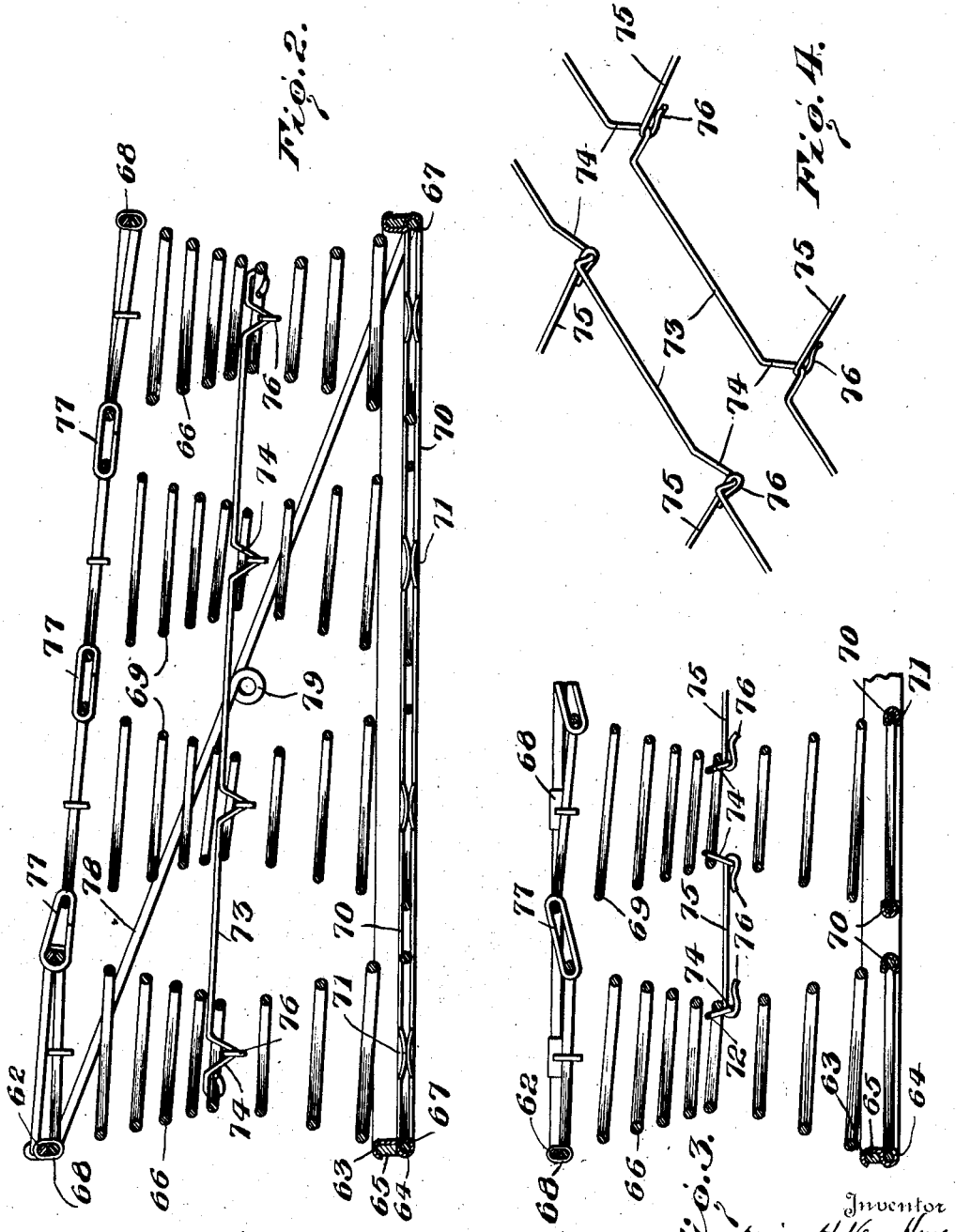

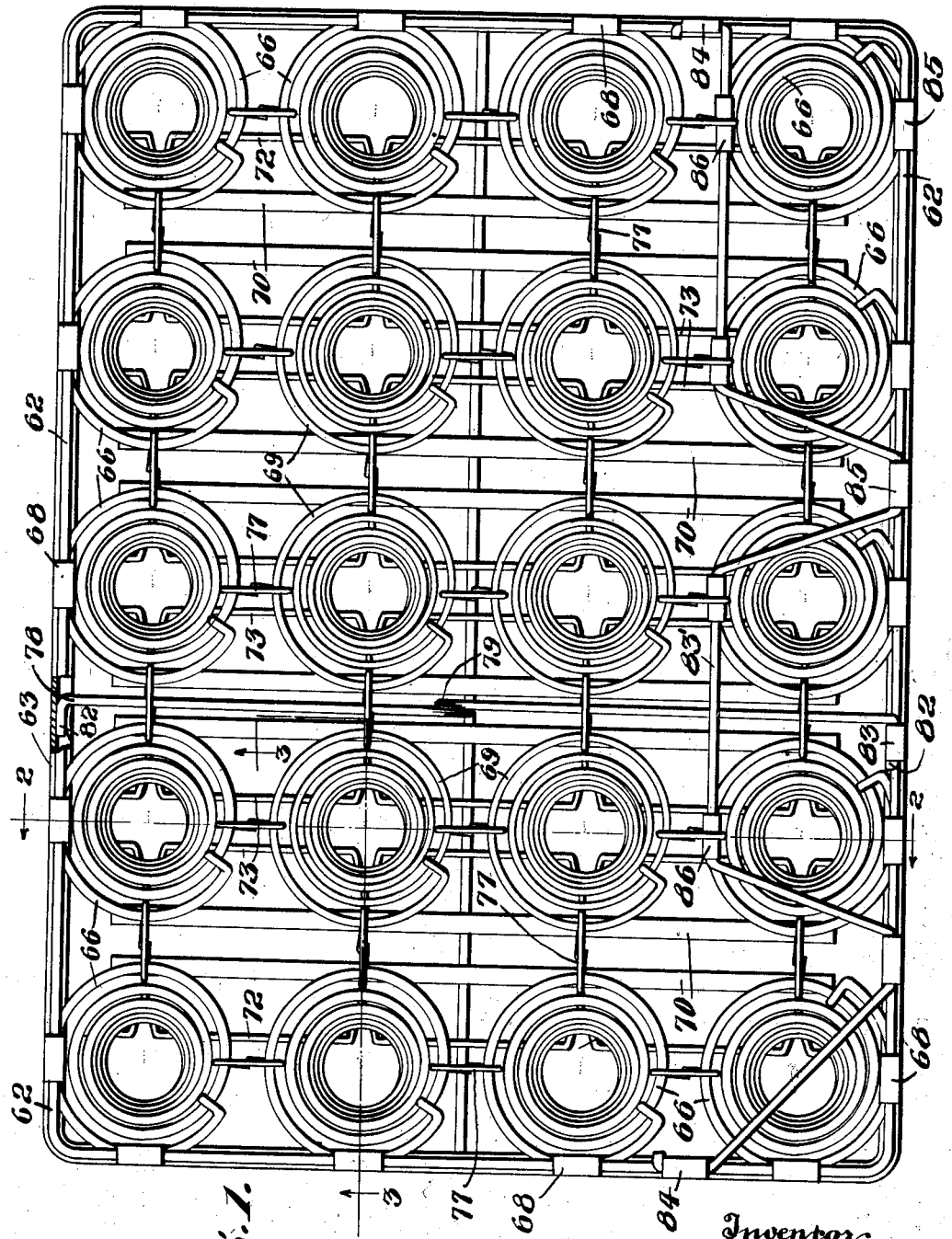

Patented June 21, 1927.

1,632,936

UNITED STATES PATENT OFFICE.

DESIRE H. VAN HOVE, OF JACKSON, MICHIGAN, ASSIGNOR TO REYNOLDS SPRING COMPANY, OF JACKSON, MICHIGAN, A CORPORATION OF DELAWARE.

SPRING STRUCTURE.

Application filed June 11, 1921. Serial No. 476,814.

This invention relates to spring structures.

One of the aims of automobile manufacturers has been to provide for ease and comfort to the riders of the cars. The springs of an automobile chassis often cause such shaking and jolting to the rider as to annoy him. The springs of the chassis also frequently rebound or recoil to such an extent as to throw the occupants from side to side and sometimes lift them bodily off the seats of the car. To obviate this annoyance and inconvenience, and possible injury, shock absorbers have been employed, but they have not entirely eliminated the difficulties mentioned.

Riders of automobiles are frequently shifted from side to side and in other directions on the seats on even as well as rough roadbeds, not only because of vibration and jolting, incident to the rebound of the chassis springs, but because of the faults or defects in the construction of the seats of the cars. The springs composing the seats frequently rebound or recoil, after compression, to such an extent as to not only cause shaking and jolting to the occupant of the seat, but often to such an extent as to lift the occupant entirely off the seat, sometimes throwing the occupant of the seat against the top of the car. Serious accidents have been known to occur to occupants of automobiles because of the recoil of the seat springs.

An attempt has been made to overcome the above defects and disadvantages in spring structures through the instrumentality of what are known as "double deck" spring structures, that is, structures employing border springs and inner springs, the inner springs being composed of an upper group of springs mounted upon a lower group of springs, and while such structures have been effective, by overcoming the objections recited to a certain extent, such structures are expensive of manufacture, in that separate clips are necessary between the abutting ends of the upper and lower groups of springs, requiring time to assemble, and increasing the cost of manufacture and in these structures noises are occasioned because of contact of the abutting ends of the springs, necessitating, in order to overcome the noise, sheets of fabric or wire woven material between them to deaden the noise, further increasing the expense of manufacture. There are other structures of "double deck" type wherein all the springs of the structure consist of upper and lower groups of springs connected together and such structures have the same disadvantages as the first type of "double deck" structures recited.

It is, therefore, one object of the present invention to provide a spring structure adapted particularly for automobile seats wherein the recoil or rebound of the compressed springs in the seat, incident to vibration, jolting or heavy weights, is eliminated, constrained and confined to such an extent that the occupant of the seat rides with ease and comfort and is not in danger of being shaken or thrown off the seat incident to vibration or recoil of the seat springs.

Another object of the invention is to provide a spring structure wherein each spring has a relatively stiff lower shock absorbing portion and an upper relatively resilient pliable portion in combination with means to confine or restrain the shock absorbing base portions of the springs so as to prevent complete compression and to limit the throw of the recoil of the base portions.

Another object is to provide a spring structure wherein each spring has convolutions of different pitch, forming in each spring, portions of different resiliency, one portion having greater resistance to compression than the other portion to absorb the shocks and to cushion such other portion of the spring.

Another object resides in the provision of a spring structure provided with rows of single springs, each spring having convolutions of different pitch so as to form in one and the same spring, portions of different resiliency, one portion to absorb the shocks and to cushion such other portion of the spring, and means constructed and arranged to limit compression and recoil of the shock-absorbing part of the spring.

A further object is to provide a spring structure composed of rows of single springs, each spring having convolutions of different pitch for forming in each spring, portions of different resiliency, and means connected to the springs adapted to restrain the degree of compression and the extent of recoil of the base portions of the springs and to confine the base portions to a substantially vertical movement only and permit of individual vertical and lateral play of the upper portions of the springs.

It is still further desired to provide a spring structure embodying the above and other objects and advantages, and which may be used for automobile, couch, bed, or other household furniture, railroad car and other seats or for backs for spring seats wherever the latter may be usable.

With the above and other objects in view, the invention consists in the novel construction, combination and arrangement of parts hereinafter fully described, illustrated in the accompanying drawings and pointed out in the claim hereto appended, it being understood that various changes in the form, proportion and minor details of construction, within the scope of the claim, may be resorted to without departing from the spirit or sacrificing any of the advantages of the invention:

In the drawings:

Fig. 1 is a top plan view of one embodiment of the invention;

Fig. 2 is a transverse sectional view;

Fig. 3 is a fragmentary sectional view taken on the line 3—3 in Fig. 1;

Fig. 4 is a detail fragmentary perspective view of one embodiment of means for limiting compression and recoil of the springs.

Referring now to the accompanying drawings, and more particularly to Figs. 1 to 3, inclusive, the reference characters 62 and 63 indicate upper and lower border frames, respectively, the upper frame in this instance being shown as composed of wire and the lower frame being shown as composed of channelled sheet metal provided with an inner groove 64 and an outer groove adapted to receive a wooden insert 65 to which latter may be connected the side facing of the upholstering material, not shown. These upper and lower frames may be composed of any other suitable material, and they may take any other desired form or shape than that illustrated in the accompanying drawings, as will be seen by a further reading of the specification and reference to the accompanying drawings. The various types of frames and means for connecting the springs, as now on the market, and as contemplated for the future, as designed by me, are illustrated and described because of the desire to show the various applications of different types of connections in structures embodying my invention.

A set of border springs 66 are connected to the upper and lower frames in any suitable manner, these border springs, as shown in Figs. 1 to 3, inclusive, being of the double cone type and have their lower convolutions fitted in the aforesaid inner groove 64 of the base frame 63 and compressed therein, as at 67, or otherwise secured to the base frame, as hereinafter disclosed, with their upper ends secured to the upper border frame by means of suitable clips 68.

An inner group of springs 69, of the same type as the springs 66, are arranged within the frames and within the border springs and these inner springs may be of lighter gauge wire than the border springs, as shown. These inner springs have their lower convolutions fitted in channeled or U-shaped spring supporting bars 70 and to effect a tight connection between the lower convolutions of these inner springs and these bars, the bars are preferably pinched or compressed onto the springs as indicated at 71. In the same manner, the lower convolutions of the border springs are secured in the channels of these U-shaped bars, as clearly shown in the accompanying drawings. It may be stated, however, that any other type of spring supporting bars may be employed so far as the present invention is concerned, examples of which are disclosed herein.

Both the border and the inner springs are shown in Figs. 1 to 3, inclusive, as formed alike, and as illustrated they are of the double cone type, each having convolutions of different pitch. For instance, the upper portion of each spring has its convolutions coiled closer together than are the convolutions of the lower portion of each spring, the upper portion of each spring having preferably a greater number of coils than the lower portion thereof. The lower portions of the springs form relatively stiff shock absorbing base portions adapted to cushion the more resilient pliable upper portions of the springs, as will be explained hereinafter.

To prevent a complete compression of the shock absorbing base portions of the springs and to limit the recoil of the springs after compression, beyond the normal position of the base portions, I provide means for restraining and confining the contraction and expansion of the base portions of the springs within certain limits so as to limit or restrain both the degree of compression and the degree of recoil of the springs and thereby overcome and prevent such rebound or recoil as frequently causes the occupant of the seat to be shifted and sometimes lifted entirely off the seat. For such purposes, I have illustrated a number of embodiments of the invention, but as shown in Figs. 1 to 3, inclusive, this means consists of end stays 72 and pairs of stays 73, all of the stays being formed alike, passed through the springs of respective rows at points substantially midway of the ends of the springs, and as shown, slightly off the center and preferably directed between what may be regarded as the two lowermost convolutions of the upper portions of the springs.

The end stays 72 are hooked or bent at their outer ends over a convolution of the corner springs, or they may be otherwise secured thereto. Each end stay has downwardly directed substantially V-shaped kinks 74 located within the coils of the respective springs.

The pairs of stays are formed the same as the end stays and connected to the respective front and rear springs, as are the ends of the end stays connected to the border springs, and all of these stays have their kinks arranged substantially in alinement across the structure, as shown.

Connecting the kinks 74 of the stays are relatively short stays 75. The ends of these short stays 75 may be connected to the kinks 74 of the stays in any suitable manner. As shown, the short stays have hooked connections 76 with the kinks. This arrangement of stays provides what may be termed a "net-work" connection between the springs, and it has been found to be effective for the performance of the functions for which it is intended, particularly for the purpose of limiting compression of the base portion of the springs and for limiting expansion or recoil after compression.

The result of the aforesaid means or method of connecting the springs of different pitch together in the manner recited and at the points noted is that the lower or base portions of the springs are held or confined so as to have only substantially a vertical movement, while the upper portions of the springs have both a vertical play and also an individual lateral movement, providing for a resilient pliable soft center reinforced or cushioned by the base portions of the springs. The further result is that by virtue of one spring at its lower portion pulling upon the lower portion of another spring, as for instance, when the structure is under compression, the degree of compression is limited to prevent complete compression of the lower or base portions of the springs and the recoil, due to expansion of the lower portions of the springs, as when the structure is relieved of excessive pressure or weight, is restrained and limited to prevent recoil beyond the normal position of the normally expanded base portions of the springs.

The upper portions of the springs are more resilient than the lower springs and compress to a greater extent, under the action of weight, than the lower portions of the springs, but the compression of the upper portions of the springs is cushioned by the relatively stiff opposing force by the base portions of the springs. The rider is not subjected to shock such as is likely to throw him into contact with the body or top of the car and this is one of the essential features of the present invention.

The vertical play of the upper portions of the springs may be limited by suitable link connections 77 which connect the upper convolutions of the adjacent springs. These link connections 77 are readily snapped on to the springs and are preferably of loop shape as shown, permitting compression of the upper portions of some of the springs slightly without compressing the upper portions of any of the other springs; or, as in the case when most of the seat is occupied, a number of these springs, which are taking weight, may be compressed slightly without causing compression of the upper portions of the adjacent springs because of the particular loop formation of the link 77. As the upper portions of a number of the springs are subjected to weight, beyond a certain point, it is possible that compression of all of the springs will be brought into play by virtue of the link connections 77, depending upon the area of the weight brought to bear upon the structure. On the expansion of the upper portions of the springs against the weight of the rider, the recoil is relatively weak, due to the weight of the rider and to the closeness of coil of the upper portions of the springs. So, therefore, the recoil, if any, exists in the base portions of the springs and is confined thereto, and the recoil of the lower portions of the springs being restrained by the aforesaid restraining means, the force of recoil is practically eliminated.

To balance and stay the frames against lateral movement with relation to each other, I may connect a diagonally disposed stay 78 with the back of the upper frame and with the front of the lower frame, or vice versa, as the case may be, the stay being coiled, if desired, as indicated at 79 in Fig. 2. This stay 78 has laterally directed ends 82 whereby it may be firmly connected to the frames, either by pinching or compressing the laterally directed ends 82 in the inner groove of the base frame or by clipping the same as at 83 to the upper frame.

If it be desired to stiffen or reinforce the front edge of the upper frame, a wire may be connected to the upper frame at its front portion in any suitable manner. One form of wire is shown particularly in Fig. 1 and is of zig-zag form, being indicated by the reference character 83'. This wire 83' may be connected by clips 84 to the ends of the top frame and to the front of the top frame by clips 85 and to the rear of the upper convolutions of the front row of springs by clips 86.

Various other modifications of means associated with double cone springs of different pitch for the purpose of preventing complete compression and for restraining recoil of the springs may be employed.

This application is a continuation in part of applicant's application filed March 22, 1921, Serial No. 454,353, the latter application having been abandoned May 19, 1923 in favor of this present application.

What is claimed is:—

A spring structure including a base, a set of outer border coil springs and a set of inner coil springs mounted upon the said base, the border springs being of greater gauge than the inner springs, each of the springs of both the inner and outer sets having double cone portions of approximately uniform size and of different pitch to form in each spring a relatively stiff lower conical shock-absorbing base portion and a relatively resilient upper inverted conical portion cushioned by the base portion, and connections between the entral portions of the springs by which any considerable displacement of the central portion of any one spring is resisted by the resilience of the other springs.

In testimony whereof I have hereunto set my hand.

DESIRE H. VAN HOVE.